A. BLACK.
Candle Mold.
No. 35,359. Patented May 27, 1862.
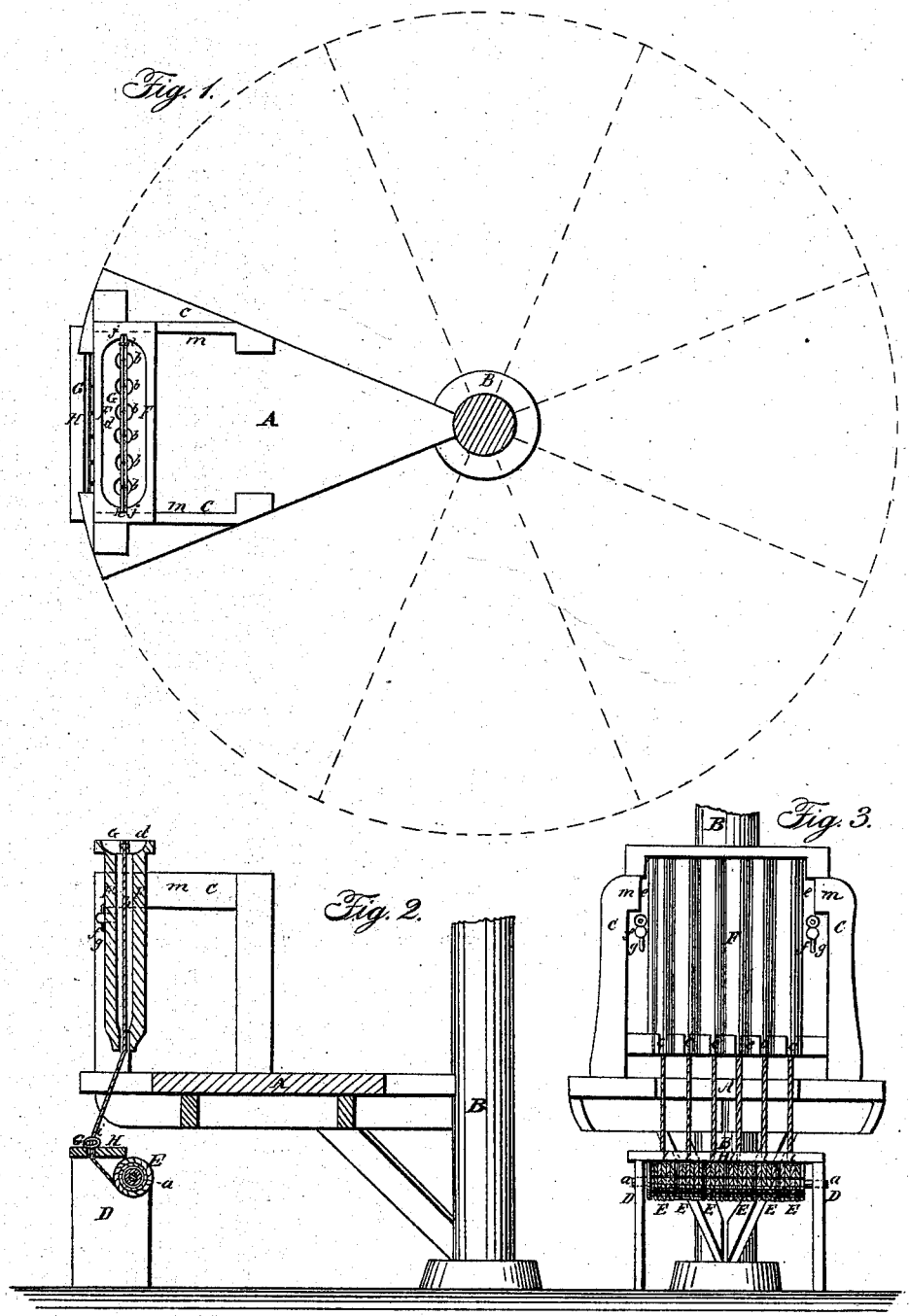

UNITED STATES PATENT OFFICE.

ANDREW BLACK, OF NEW YORK, N. Y.

IMPROVED MACHINE FOR MAKING MOLD-CANDLES.

Specification forming part of Letters Patent No. 35,359, dated May 27, 1862.

*To all whom it may concern:*

Be it known that I, ANDREW BLACK, of the city, county, and State of New York, have invented a new and Improved Machine for Making Mold-Candles; and I do hereby declare that the following is a full, clear, and exact description of the same, reference being had to the accompanying drawings, forming part of this specification, in which—

Figure 1 is a plan of the machine. Fig. 2 is a vertical section of the same. Fig. 3 is a front view of the same.

Similar letters of reference indicate corresponding parts in the several figures.

This machine consists of a horizontal rotating tube divided radially to its center into any number of equal sections, each one of which has secured to it a rack for the reception of the molds, and on one side of or in front of which is situated a series of spools, from which, and a perforated board through which, the wick is supplied to the molds when the latter are brought opposite to them by the rotation of the table, the molds being divided vertically and centrally for the reception of the wicks and the removal of the candles, and clamps being used to receive the wicks from the spools for their introduction to the molds, and to retain them in the molds before and during the pouring of the tallow or other material thereinto.

To enable those skilled in the art to make and use my invention, I will proceed to describe its construction and operation.

A represents one of the sections of the horizontal rotating table, which is supported by the central shaft, B. C C is the rack erected upon the said section A for the support of the molds. The other sections of the table are similar to A and have similar racks erected upon them.

D D is a stationary rack for the wick-spools E E, arranged in front of the table and some distance below it. The spools correspond in number with the candles to be formed in a single mold, and are arranged to turn freely on a stationary horizontal spindle, *a*.

On the top of the rack D D is what I call the "stationary wick-board" H, arranged horizontally, and having in it a number of holes, *l l*, for the passage of the wicks corresponding with the number of spools.

F is one of the molds containing any number of cavities, *b b*, of suitable form for the candles, having its sides grooved at *e e* to fit and slide on suitable horizontal ways, *m m*, on the rack C C. This mold is divided vertically in a plane passing through the centers of all the cavities *b b*, and the two parts are fitted together at the bottom, with tongues *c c* on one and corresponding grooves in the other, and one of them is fitted with horizontal dowels or tenons *f f*, to fit and pass through holes in the other, and these dowels or tenons have vertical holes for the reception of pins *g g* to secure the two parts of the mold together. The bottoms of the cavities *b b* are contracted to form the tips of the candles, and have openings just large enough for the passage of the wicks. The top of the said mold is made with a funnel-like cavity, *d*, connecting all the cavities *b b* to conduct the tallow or other candle-stock to the molds and to receive any overflow in the filling of the said cavities.

G G are the wick-clamps, each consisting of two straight half-round bars connected together at one end by a hinge, *h*, and fitted with a ring, *i*, at the other end to secure the wicks between them. These clamps are long enough to extend across all the cavities *b b* of a mold, and recesses *j j*, for the reception of their ends, are provided in the mold at the ends of the cavity *d*, as shown in Fig. 1. The wicks are represented in red color.

In operating the machine the rotating table is turned by hand or other means to bring the sections A, one after the other, opposite to the rack D D, where they remain for a time stationary for the necessary manipulations, which are as follows: The ends of the wicks are drawn from their respective spools E E through the holes *l l* in the board H, above which they are all secured by a clamp, G. One portion of a mold is then placed on the ways *m m* of the rack C C, and the clamp G is drawn up and placed in the cavity *d* of the mold, and the other portion of the mold is then placed in the rack, and the two portions are then brought together, with the tongues *c c* of the one in the corresponding grooves of the other, and are secured together by the insertion of the pins *g g* in the dowels or tenons *f f*. The clamp G now rests in the recesses *j j* at the ends of the cavity *d* of the mold, and the melted tallow or stock is then poured into the mold. When the mold has been filled, another clamp is applied to the wicks above the board H, and the wicks are cut between the board G and the bottom of the mold, and the table is turned to bring the next section A opposite to the rack D D, and on one portion of a mold having been placed in the rack C C of this section the clamp G, last applied to the wicks, is lifted up to the top of the mold, the other portion of which is then applied as before described, preparatory to the repetition of the operation of pouring. In this manner the operation is repeated in every section of the table, and before the filled molds arrive again opposite to the rack D D they are removed from the machine to make room for empty ones. This removal may be effected by sliding them from the racks C C to a suitably-arranged stationary rack, in which, if the candles are not sufficiently set or hardened to bear removal from the molds, the latter may be allowed to rest long enough to enable the hardening to be completed. When hard, the candles are removed by opening the molds.

To enable the hardening of the candles to be effected quickly, there may be arranged in suitable relation to the table an ice-house, ice-box, or refrigerator, through which the molds, after being filled, are carried by the rotation of the table.

By the use of divided molds—such as are herein described—the candles may be externally ornamented or marked in any desirable manner.

Several molds like that represented may be arranged together in each rack C C and the whole secured together in a closed condition by one set of fastenings, and these molds may be all supplied with wick from one set of spools, or a separate set of spools may be provided for each one.

What I claim as my invention, and desire to secure by Letters Patent, is—

1. The combination of a horizontally-rotating mold-table and a series of wick-spools, E E, arranged in a stationary rack or stand, D, substantially as herein specified.

2. The combination, with the horizontally-rotating mold-table and the series of wick-spools E E, of a perforated wick-board, H, and a system of wick-clamps, G G, substantially as herein specified.

3. The employment for molding candles of divided molds constructed to operate substantially as herein described.

4. The arrangement of the molds to slide, substantially as herein described, on horizontal racks C C, curved by a horizontally-rotating table.

ANDW. BLACK.

Witnesses:
JAMES LAIRD,
G. W. REED.